Aug. 8, 1961 R. V. PHELPS 2,995,015
METHOD OF INSTALLING A DRY DOCK STORAGE BARGE FACILITY
Filed Dec. 11, 1956 3 Sheets-Sheet 1

INVENTOR
REX V. PHELPS
BY
ATTORNEY

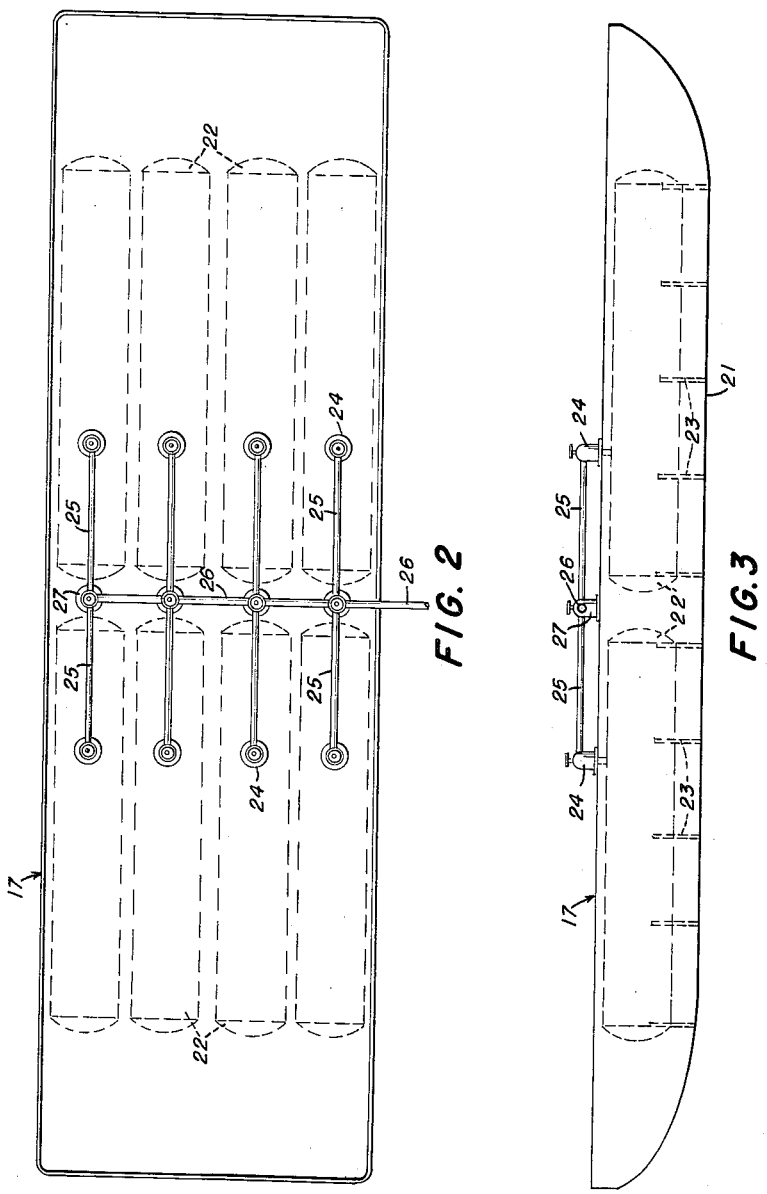

Aug. 8, 1961 R. V. PHELPS 2,995,015
METHOD OF INSTALLING A DRY DOCK STORAGE BARGE FACILITY
Filed Dec. 11, 1956 3 Sheets-Sheet 3
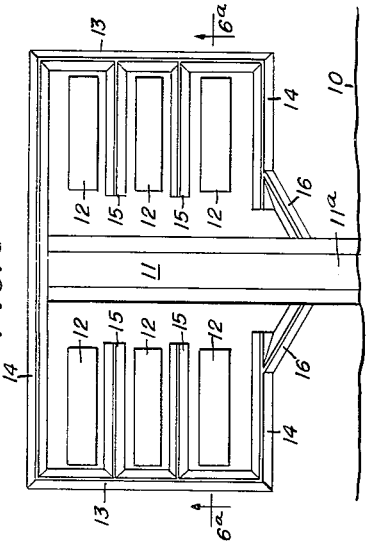
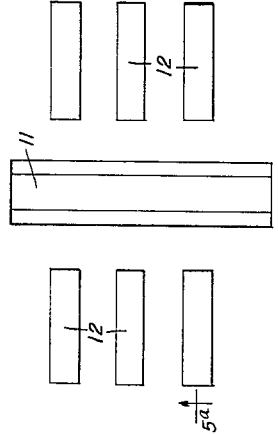
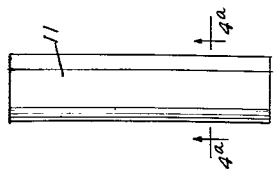
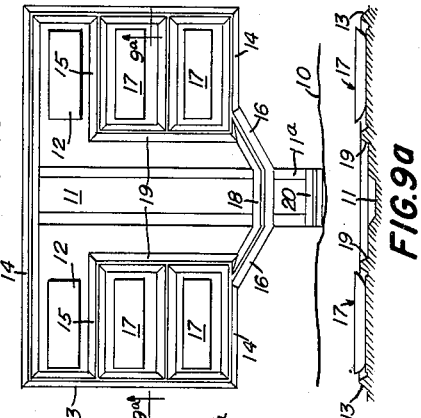
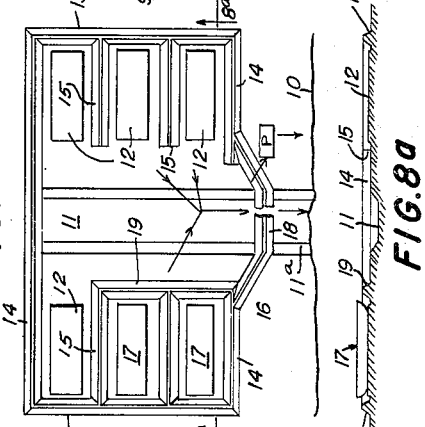
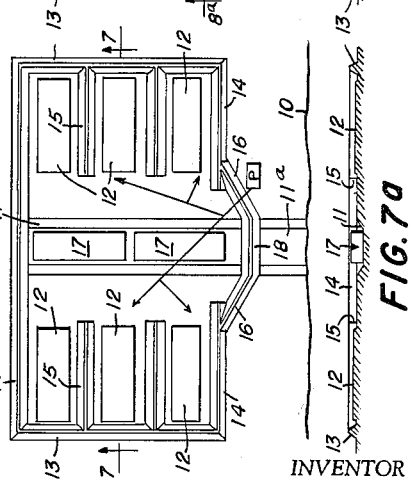
INVENTOR
REX V. PHELPS
BY
ATTORNEY

United States Patent Office 2,995,015
Patented Aug. 8, 1961

2,995,015
METHOD OF INSTALLING A DRY DOCK STORAGE BARGE FACILITY
Rex V. Phelps, Tulsa, Okla., assignor to Warren Petroleum Corporation, Tulsa, Okla., a corporation of Delaware
Filed Dec. 11, 1956, Ser. No. 627,699
1 Claim. (Cl. 61—64)

This invention relates to a method of dry-docking barges and consists more particularly in new and useful improvements in methods of installing a dry dock storage barge facility, wherein more or less conventional barges such for example as those employed in the transportation of gasoline and liquefied petroleum gas, may be installed and utilized in a semi-permanent storage facility at remote distribution points where the construction of permanent storage tanks often presents a serious problem.

Under present practices, many of the larger concerns with sales outlets abroad or at points adjacent a navigable body of water, transport such products as gasoline and liquefied petroleum gas, in barges and tankers and in order to discharge the contents of these vessels at their destinations, so that the vessels will be available for continued transportation use, it is necessary to install storage tanks, pumps and various handling equipment. In many of the foreign countries, particularly the smaller ones and those remotely located, suitable storage tanks and handling equipment are not readily available for installations and it is necessary to transport the entire storage facility and install it at the desired point adjacent a shore line before transported products can be received. This is not only expensive but in many instances, the required material and equipment are simply not available.

It is therefore the primary object of the present invention to provide a method of dry docking substantially conventional barges whereby they may be floated in and installed on previously prepared foundations which, after the water is discharged from the dry dock, will support the barges for use as permanent storage facilities with suitable pumps, pipelines and headers for handling the incoming and outgoing products.

Another object of the invention is to provide a method of installing a dry dock storage barge facility wherein a series of barges already equipped with the necessary tanks, pumps, gauges and handling equipment, can be floated in and set upon prepared foundations so as to provide self-contained storage facilities which are capable of bodily removal and transfer to other locations with 100% salvage value, when the facility is wholly or partially dismantled.

A further object and advantage of the present invention lies in the fact that the storage barges can be completely constructed and equipped at a point where the necessary materials, pumps, gauges, etc. are readily available and then transported by water to remote locations for installation in a storage barge dry dock where they will be immediately ready for use.

Still another object of the invention is to provide an expandable storage facility of this nature which is so constructed as to permit the installation of additional storage barges without flooding or otherwise disturbing the foundations of barges which are already installed. The construction further provides for the selective removal and transportation of barges for use in other storage facilities.

With the above and other objects in view which will appear as the description proceeds, the invention consists in the novel features herein set forth, illustrated in the accompanying drawings and more particularly pointed out in the appended claim.

Referring to the drawings in which numerals of like character designate similar parts throughout the several views, FIGURE 1 is a diagrammatic plan view of a completed installation.

FIGURE 2 is a plan view of a preferred form of barge for use in the storage facility.

FIGURE 3 is a view of the barge in side elevation.

Figure 1:
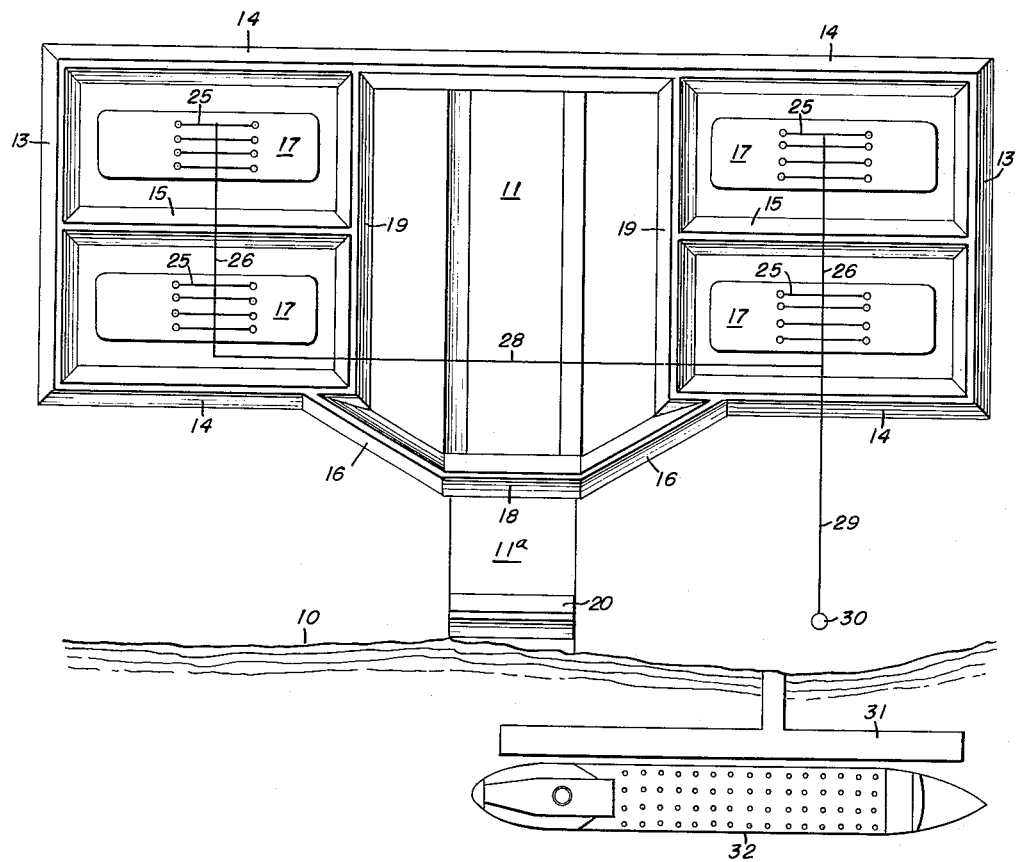

FIGURES 4 and 4a to FIGURES 9 and 9a, diagrammatically illustrate the successive steps which are followed in the installation of the storage barge drydock facility, FIGURES 4 to 9 representing plan views of the various steps and FIGURES 4a to 9a, cross-sectional views.

The consecutive steps followed in the installation of the storage barge dry dock of the present invention and the various stages of construction will best be understood by reference to FIGURES 4 to 9a of the accompanying drawings. After selecting a suitable location adjacent the shore line 10 of a navigable body of water, a channel 11 is excavated from a point spaced inwardly from the shore line 10 a predetermined distance and extending for a length determined by the ultimate size of the facility to be installed. Preferably, the initial channel 11, for an installation designed for the use of six storage barges 17 arranged in parallel rows of three barges each, would be approximately 770 feet long with a channel width of approximately 120 feet and a depth of 7 ft. 6 inches. The longitudinal walls of the channel are preferably beveled outwardly making a total channel width of 180 feet.

The barges 17 contemplated for use in the facility of the present invention, as shown in FIGURES 2 and 3, are 320 feet long by 92 feet wide and the next step in the method of construction is the preparation of suitable foundations 12 for the selected number of barges 17. As shown in FIGURES 5 and 5a, two rows of laterally spaced foundations 12 are prepared, one row on each side of the channel 11, with their longitudinal center lines parallel to one another but arranged at right angles to the longitudinal center line of the channel 11. These foundations 12 consist of tamped sand in rectangular areas approximately 320 feet long by 100 feet wide, the inner ends of the respective foundations 12 being arranged approximately 265 feet from the longitudinal center line of the channel 11 and the longitudinal center lines of the foundations 12 being spaced approximately 220 feet apart. Sand is added and tamped in each foundation until a height of 12 inches of tamped sand has been attained, as shown in FIGURE 5a.

Each of the tamped sand foundations 12, as shown in FIGURES 6 and 6a, is now enclosed on three sides by a suitable dyke construction comprising end walls 13 which extend the full length of the respective rows of foundations 12, terminating at opposite ends in right angularly disposed side walls 14 which are directed toward the channel 11. The individual foundations 12 are separated by intermediate walls 15, running parallel with the side walls 14 and contiguous with the respective end walls 13. The dykes 13, 14, 15 may be constructed in any suitable manner but it has been found that simple earthen dykes are quite satisfactory.

Each of these dykes 13, 14, and 15 is preferably 9 feet in height and tapered to a central crown from a base approximately 50 feet across. The side walls 14 are preferably 450 feet long and at this stage, the intermediate walls 15 are made 405 feet long so as to accommodate inner end walls 19 as will later appear. The distance between the spaced parallel walls 14 and 15 is approximately 170 feet to provide ample roof for maneuvering a barge 17 from the channel 11 into the open ended berths formed by said walls 13, 14 and 15. A pair of angularly disposed converging dykes 16 are now constructed from the inner ends of the side walls 14 adjacent the short line 10, to the channel 11 and the excavation of the channel is extended to the shore line 10 as at 11a. Thus, there is provided a dyke structure open to the shore line 10 at 11a and completely bounding the foundation area and laterally separating the individual foundations 12, to provide around each of the latter a separate stall or berthing area, open at the end adjacent the channel 11. The opening of the channel 11 at the shore line as at 11a, permits water to flow in and fill the channel 11.

Barges 17 are now floated into the channel 11 and the chanel dyke 16—16 is closed across the channel by a cross dyke 18, as shown in FIGURE 7. Water may be pumped into the dyke-enclosed foundation areas by any suitable means diagrammatically shown at P, until each of the open ended berths around the foundations 12, is flooded to a depth which will permit the maneuvering of the barges 17 from the channel 11, into their respective berths, as shown in FIGURE 8.

The proper location of the respective barges 17 having been accomplished, the dyke-enclosed area is drained and the water pumped out which permits the barges 17 to gradually settle upon their respective foundations 12 and the open ends of those berths now housing the barges, are closed by dykes 19. These end closure dykes 19 completely isolate the settled barges from the channel 11 and the remainder of the dyke-enclosed area, so that these barges and their foundations are not disturbed when future barges are installed as the capacity of the facility is increased by the addition of further barges or if it is desired to remove a selected barge 17 for transportation elsewhere. Then, as shown in FIGURE 9, after the ends of the various berths are closed, the channel opening 11a is preferably closed at the shore line by a cross-dyke 20.

The specific structure of the barges used in connection with this dry dock storage facility is not in itself, a part of the present invention as various forms of barges may be employed. One form of barge is shown more or less diagrammatically in FIGURES 2 and 3 where it will be seen that each of the barges 17, which may be constructed of suitable metal plate forming a relatively long and wide flat bottomed hull 21, is designed to contain a plurality of horizontally disposed storage tanks 22. These tanks 22 are supported in parallel rows on suitable cradles 23 and each tank 22 is equipped with conventional piping and pumping equipment housed in a dome 24 which protrudes from the deck of the barge. The pumping equipment of each barge is connected by a pipe 25 to a header 26, provided with suitable valves 27 to selectively control the charging and discharging of the respective tanks 22. The barges are rigidly constructed vessels designed to withstand extreme stresses and strains and each is initially equipped with all of the necessary pumps, gauges and valves required for immediate use after it is installed in the storage facility.

Thus, as each barge 17 is floated into its berth and settled upon its foundation 12, its header 26 is connected to a main header 28 leading through a pipeline 29 to a point of distribution 30 which may be located at the shore line 10 so as to be accessible to a water dock 31 for serving transportation vessels 32 either in charging or discharging the various barges 17.

By employing the method of the present invention, it will be apparent that the construction of a storage facility in remote locations is greatly simplified and facilitated. The construction of conventional and expensive storage tanks with the necessary foundations and piling is eliminated as the barges simply set upon the sand foundation and a slight settling at one point or another is of no significance because of the fact that the barges are constructed to withstand such stresses. Furthermore, the present invention makes possible the complete salvage of the storage barges when it is desired to dismantle the facility or transfer it either in whole or in part, to another location. The fact that each barge is a selfcontained storage entity, enables it to be moved to another location and immediately put into use.

From the foregoing it is believed that the invention may be readily understood by those skilled in the art without further description, it being borne in mind that numerous changes may be made in the details disclosed, without departing from the spirit of the invention as set forth in the following claim.

I claim:

A method for constructing a material handling facility adjacent the shoreline of a navigable body of water which comprises excavating a channel from a point spaced inwardly from a shoreline, preparing a plurality of juxtapositioned flat foundations adjacent said channel to provide a berthing area, erecting a main dyke to completely enclose the berthing area except the channel entrance thereto, erecting intermediate dykes between adjacent foundations within the berthing area contiguous with said main dyke, the intermediate dykes serving to laterally separate the foundations and thereby form individual berths, extending said channel to the shoreline to admit water from the navigable body of water into the channel, floating a barge from said navigable body of water into said channel within the berthing area, extending said main dyke to close the channel at the entrance to the berthing area, pumping water into the main dyke-enclosed area and channel therewithin, thereby flooding the berths, maneuvering a barge from said channel within the berthing area into its respective berth, pumping water from the berthing area to lower and rest said barge upon its respective foundation, erecting an end dyke to completely isolate the berth from the berthing area and installing a transfer line from said central distribution point outside the berthing area to each berthed barge, thereby to provide a means for transferring material between each berthed barge and the central distribution point.

References Cited in the file of this patent

UNITED STATES PATENTS

| 1,376,345 | Lawton | Apr. 26, 1921 |
| 2,346,505 | Preuss | Apr. 11, 1944 |
| 2,397,155 | Rauch | Mar. 26, 1946 |
| 2,568,751 | Larsen | Sept. 25, 1951 |

FOREIGN PATENTS

| 3,155 | France | 1932 |
| 57,342 | France | Feb. 9, 1863 |
| 29,289 | Sweden | 1910 |
| 619,804 | France | 1927 |